United States Patent
Fransen

(10) Patent No.: US 10,423,970 B2
(45) Date of Patent: Sep. 24, 2019

(54) CHANGING DEPTH OF ANALYTICS TRACKING OR CONTENT TARGETING BASED ON USER VALUE

(71) Applicant: ADOBE INC., San Jose, CA (US)

(72) Inventor: Peter Raymond Fransen, Lehi, UT (US)

(73) Assignee: Adobe Inc., San Jose, CA (US)

(*) Notice: Subject to any disclaimer, the term of this patent is extended or adjusted under 35 U.S.C. 154(b) by 347 days.

(21) Appl. No.: 13/975,625

(22) Filed: Aug. 26, 2013

(65) Prior Publication Data

US 2015/0058074 A1 Feb. 26, 2015

(51) Int. Cl.
*G06Q 30/02* (2012.01)

(52) U.S. Cl.
CPC .................. *G06Q 30/0201* (2013.01)

(58) Field of Classification Search
None
See application file for complete search history.

(56) References Cited

U.S. PATENT DOCUMENTS

| 6,055,573 | A | * | 4/2000 | Gardenswartz | G06Q 30/02 709/219 |
| 6,182,060 | B1 | * | 1/2001 | Hedgcock | G06F 17/30592 |
| 2005/0080657 | A1 | * | 4/2005 | Crow et al. | 705/8 |
| 2005/0127167 | A1 | * | 6/2005 | Nakajima | G06Q 20/02 235/380 |
| 2012/0005113 | A1 | * | 1/2012 | Kotis | 705/321 |
| 2012/0116590 | A1 | * | 5/2012 | Florez-Larrahondo | G06F 1/206 700/275 |

\* cited by examiner

*Primary Examiner* — Jeff A Burke
*Assistant Examiner* — Huen Wong
(74) *Attorney, Agent, or Firm* — Shook, Hardy & Bacon L.L.P.

(57) ABSTRACT

In an example embodiment, user interactions with a software component may be tracked in an efficient manner. Specifically, an analytics tracking request triggered by user interaction with a software component is received. Then a value assigned to the user is retrieved. It is then determined if the value assigned to the user exceeds a value threshold assigned to the analytics tracking request. Based on a comparison between the value assigned to the user and the threshold value, an analytics tracking function associated with the analytics tracking request is launched.

20 Claims, 9 Drawing Sheets

CHANGING DEPTH OF ANALYTICS TRACKING OR CONTENT TARGETING BASED ON USER VALUE

FIELD

The present disclosure relates generally to analytics. More specifically, the present disclosure relates to changing depth of analytics tracking or content targeting based on user value.

BACKGROUND

There are many types of applications and web-based scenarios where it is necessary for application and service providers to monitor analytics about customers. For example, a mobile game provider may wish to monitor game traffic to provide advertising. Typically such analytics monitoring come with a cost, either directly (by paying an analytics provider for each piece of analytics data obtained), or indirectly (through increased operating expenses for monitoring data themselves). These analytics may be gathered through user tracking/targeting calls, with a cost associated with each such call. In some instances, customers have found analytics to be too expensive. Previous attempts to reduce such analytics costs have their own limitations. For example, sampling data results in lower accuracy of the analytics.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
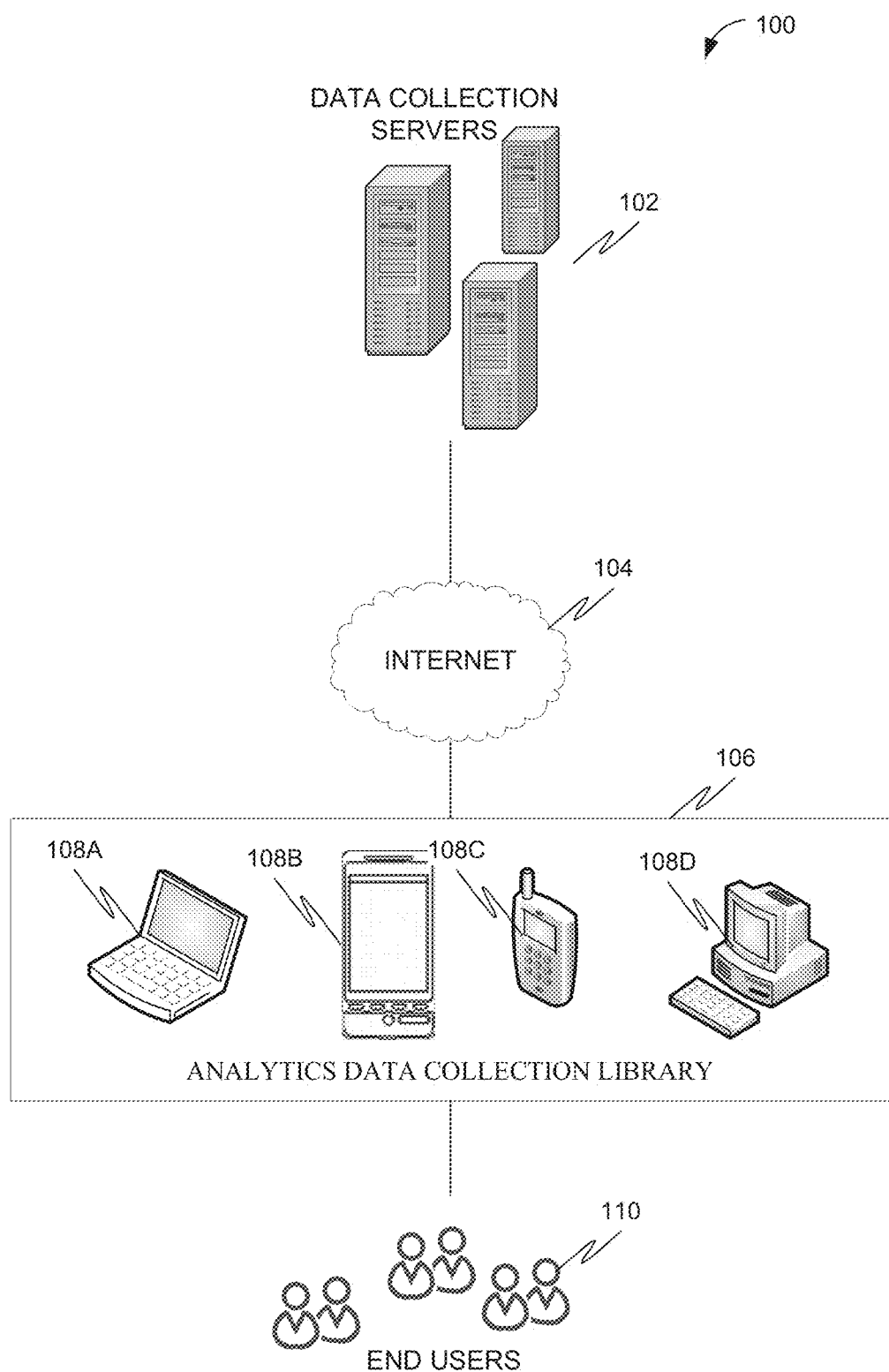
FIG. 1 is block diagram illustrating a system, in accordance with an example embodiment, of providing analytics.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, the cost generated by user tracking/targeting calls can be calculated by assigning a threshold value to specific hits. For example, normal page views may be assigned a low value, because all users tend to generate page views, whereas specific events would be assigned a high value. For high value hits, the analytics may only be monitored/sent when the user's value exceeds a predefined threshold. This prevents or minimizes the likelihood that a tracking/targeting call triggered by interactions by a low value user will be executed. Preventing such a tracking/targeting call from executing ultimately saves money for the application provider.

In an example embodiment, user value can be configured by the application provider and tailored to the expected (or intended) usage patterns of their application. Over time this value could be adjusted to manage inflation or different application monetization strategies. In another example embodiment, the initial user value and/or later adjustments to the user value can be provided automatically.

User value may be defined as any value assigned to the user that indicates an absolute or relative worth of that user to an entity. Typically, but not always, the entity in question will be the same entity that creates the code that calls an analytics tracking request triggered by user interaction with a software component. For example, the entity may be a company, such as a software developer or e-commerce company, that creates a web site or application that is used by a user. The user value in such a case would indicate the absolute or relative worth of a user to that company.

In an example embodiment, the user value is a monetary value. This may be measured by, for example, determining likely revenue or profit to be derived from the user. For example, if a particular user is expected, based on past usage, to purchase $20 worth of services in the next month, the user may be assigned a value of $20, which represents an absolute value of the user. In other example embodiments, other types of quantifiable items, such as number of visits, number of advertising views, and the like, may be used. Additionally, any number of factors may be analyzed in order to adjust user value going forward. In an example embodiment, such analysis and adjustment may be performed dynamically, as changes to user behavior or worth occur.

In an example embodiment, user worth may be assigned as a relative value rather than an absolute value. For example, users may be assigned a value of "low value" or "high value" depending upon their relative values to the entity. This assignment of relative value may be based on factors typically indicative of low or high value, such as the factors described above.

Additionally, in an example embodiment, certain factors may not necessarily be considered as indicating "low value" or "high value," but instead may have different influence based on variations within the factor. For example, as described above, page views may ordinarily be considered as a factor of low value because all users generate page views. However, there may be a particular threshold of page views where a user actually is displaying high value interactions. For example, a user who generates 100 page views a day may not be out of the ordinary and may be considered to be of low value, while a user who generates 10,000 page views a day may be something of an obsessive user (e.g., someone who is addicted to the game) and may be considered of high value even if other factors (e.g., in-game purchases) do not so reflect.

FIG. 1 is block diagram illustrating a system 100, in accordance with an example embodiment, of providing analytics. The system 100 may be implemented on any number of different hardware components. In an example embodiment, a method of providing analytics operates on one or more data collection servers 102. These data collection servers 102 may communicate via the Internet 104 with an Analytics Data Collection Library 106, including one or more custom applications. In some embodiments, each custom application in the Analytics Data Collection Library 106 may reside on a user machine, such as a laptop computer 108A, tablet computer 108B, smartphone 108C, and personal computer 108D, and the like. In other embodiments, one or more custom applications in the Analytics Data Collection Library 106 may reside on a centralized server in communication with a user machine.

The system 100 may also include an end-user audience 110, which utilizes the custom applications in the Analytics Data Collection Library 106, and thus causes calls to be made to functions in the one or more data collection servers 102.

Figure 2:
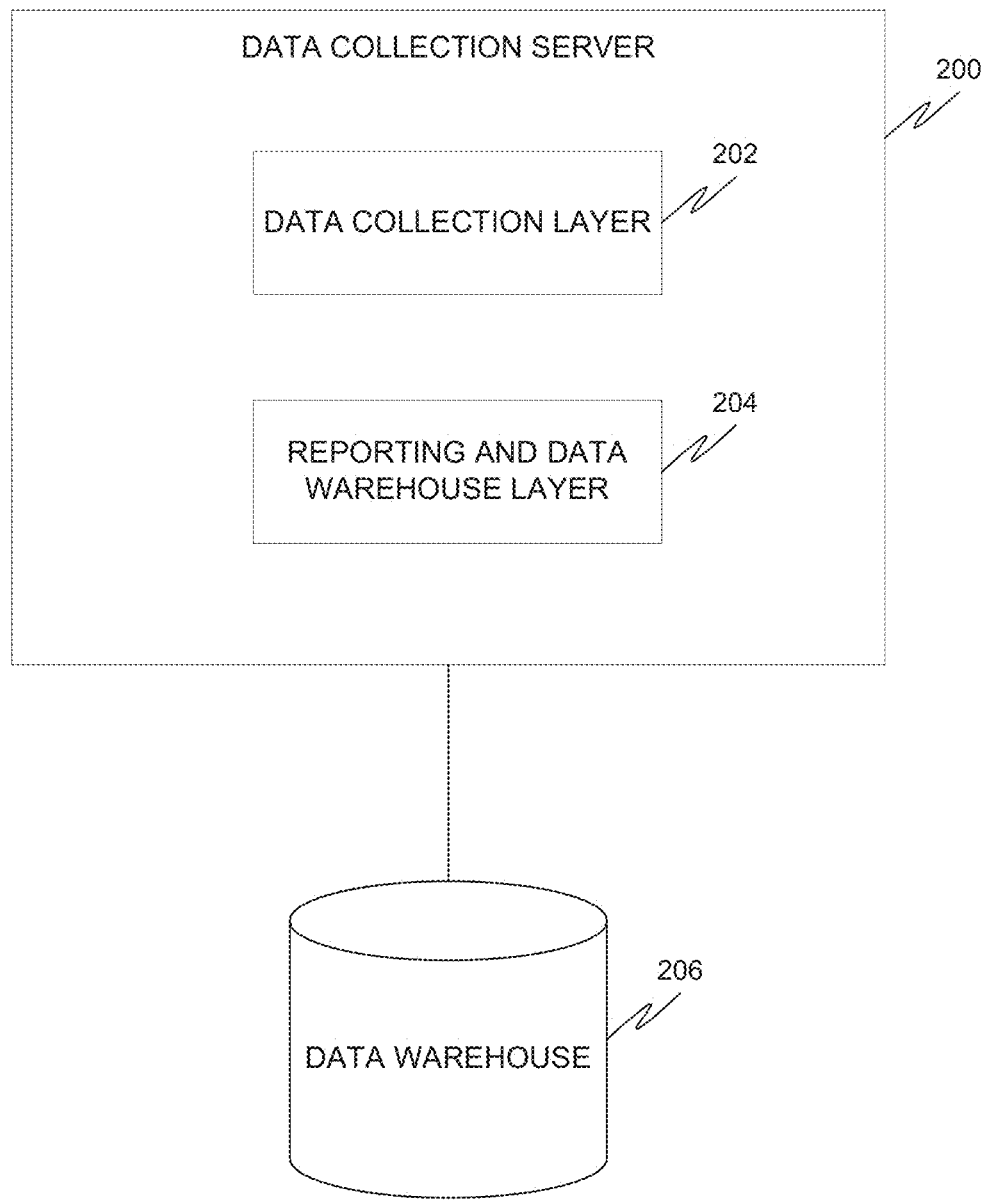
FIG. 2 is a block diagram illustrating a data collection server, in accordance with an example embodiment.

FIG. 2 is a block diagram illustrating a data collection server, in accordance with an example embodiment, such as one of the data collection servers 102, in more detail. The data collection server 200 may include a data collection layer 202, which performs tasks related to collecting and analyzing data; and a reporting and data warehouse layer 204, which performs tasks related to interfacing with users to provide reports and charts and saves data to a data warehouse 206.

Communication between the reporting and data warehouse layer 204 and the data warehouse 206 may be conducted via one or more Enterprise Application Program Interfaces (APIs). One of these APIs may be a data source API. This allows additional data from external sources to be added to a dashboard or other report. This may also be useful for uploading historical data into the dashboard or other report.

The data collection layer 202 may interface with one or more web sites or applications (not pictured). Client-side data may be retrieved via client-side tagging, whereas server-side data may be retrieved via another Enterprise API, such as a data insertion API.

The reporting and data warehouse layer 204 may also be accessed by developers or other business entities to run reports and manage data.

Client-side tagging may be accomplished by first generating code, such as JavaScript code, to be inserted into website or application code. Traffic variables may be set. Then, pre-defined events and custom links or events may be added. Offline data may be tracked via a transaction identification (ID), and a purchase ID variable may be set for events that involve purchases. Custom conversion variables can also be set. Further, uniform resource locator (URL) variables may be set using plug-in scripts. The tagging code can be verified with a debugger and data collection may also be verified. The code is then ready to use.

In an example embodiment, in order to track users at different granularities based on their perceived value, a running total of each user's value may be maintained. This data may be stored, for example, in the file system of a user device, such as with a cookie, offline storage, application settings bundle, and the like. Any time the customer value is increased, this value could be incremented by the total increase amount and re-stored for future use.

In an example embodiment, a tracking or targeting code is included in an application operating on an end-user device. This tracking or targeting code is designed to send data to a data collection server when a particular function, such as a page view, in-app purchase, or other in-app interaction is executed.

Once the total value of a user is established, this value can be compared to a preset threshold that can define the tracking/targeting capabilities that would be used for that user. In an example embodiment, this can be implemented in such a way that the tracking/targeting code would accept a required minimum level of value for the feature to be used.

As an example, assume two users, A and B. User A has a recorded value of $2.00. User B has a recorded value of $5.00. The application developer may have defined the following thresholds:

Medium Value: $1.00
High Value: $4.00

Tracking calls may then be defined for medium and high value users, (for example s.TrackMedium( ) will fire for users of medium value, which in this case is both A and B). Then, s.TrackHigh( ) will fire for users of high value (here, just B). These calls may then be included in whatever functions about which the application designer wishes to track analytics.

If a user performs an interaction that increases his or her value, such as performing a purchase or clicking on an advertisement, the user's value could be increased by an appropriate amount, such as by using a function s.increaseValue. For example, if user A's value increases by $5.00 due to an in-app purchase, then s.increaseValue(5.00) may be run for user A, which increases User A's total value to $6.00, which then causes any subsequent calls to s.TrackHigh( ) to also fire for user A.

In an example embodiment, the value of a user can also be tied to an event that incremented the user's value on the backend system, such as a counter event. This allows the application designer to properly tailor the reporting of high value users versus low value users in a segment.

The above example provides two value thresholds. It should be noted that any number of value thresholds can be defined. Additionally, these thresholds can be configurable on the fly as the overall value may need to be adjusted over time. This adjustment process could also be handled by a tag management solution or an update server that is periodically checked.

The form of the tracking code can vary greatly depending upon the type of application or service being monitored. In a web server environment, where the application is actually a web browser operating a web page, the web server may return a web page (e.g., HyperText Markup Language (HTML) page) that includes the specialized tracking/targeting code attached to any functions that the site designer wishes to monitor. This tracking/targeting code may be in the form of, for example, a JavaScript code. This JavaScript code may include a data insertion API that is used to pass data directly to the data collection server(s). As such, it is not necessary that the analytics pass through the web server (although in some example embodiments the API is designed to pass the analytics to the web server). This is an example of client-side data collection.

In an example embodiment, the thresholds for various user values may be stored in a data structure specific to the thresholds. For example, a threshold table may be designed to store the thresholds corresponding to different levels of user value.

Figure 3:
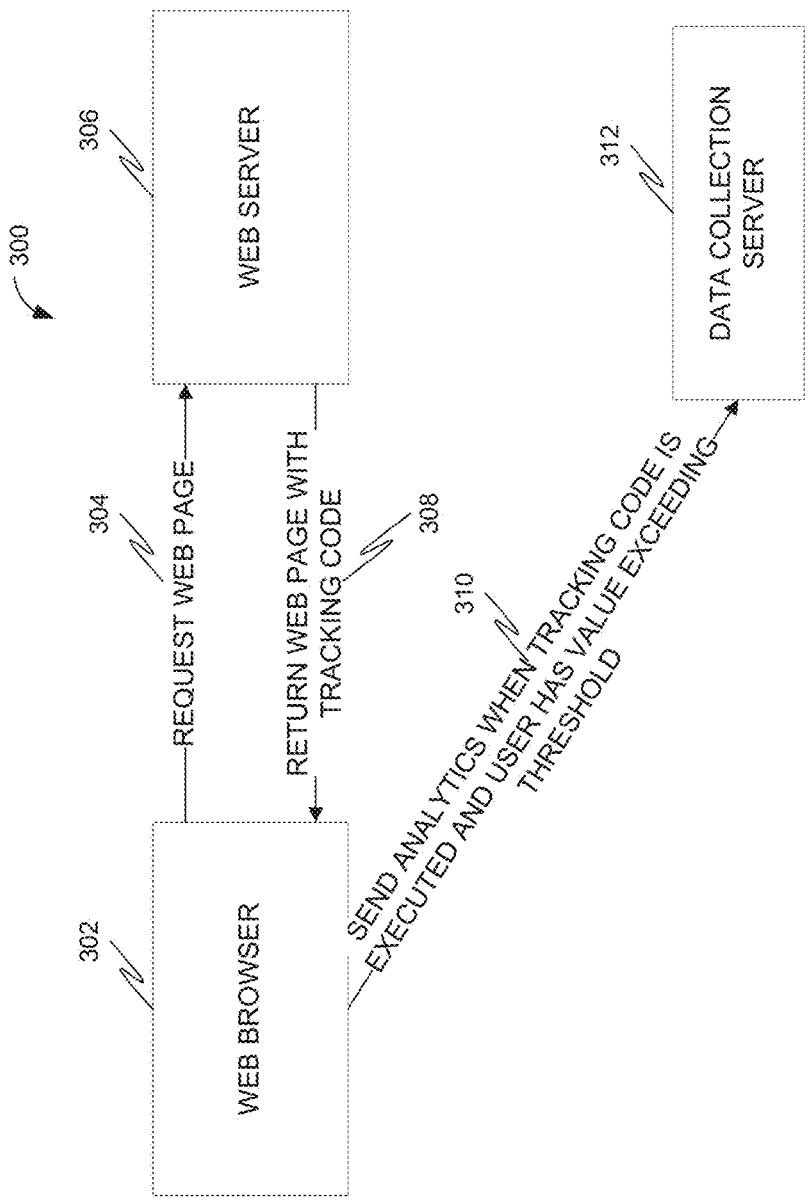
FIG. 3 is a diagram illustrating a method, in accordance with an example embodiment, of tracking user interactions with a software component on the client-side.

FIG. 3 is a diagram illustrating a method 300, in accordance with an example embodiment, of tracking user interactions with a software component on the client-side. As can be seen, the web browser 302 makes a request 304 to the web server 306 for a web page. The web server 306 then returns 308 an appropriate web page, with tracking code, to the web browser 302, which the web browser 302 runs. When an appropriate function is executed by the web browser 302 and it is determined that a user of the web browser 302 has a value exceeding a particular threshold, then the web browser 302 sends analytics 310 to the data collection server 312.

Figure 4:
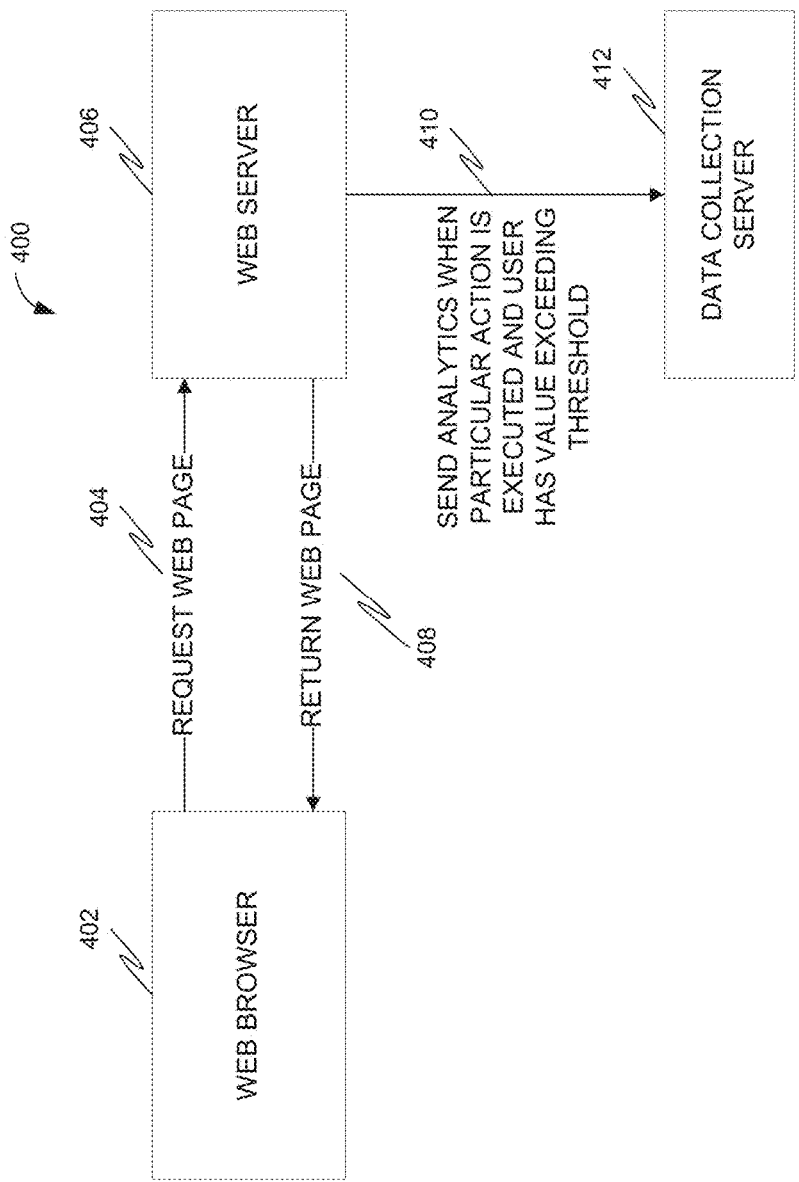
FIG. 4 is a diagram illustrating a method, in accordance with an example embodiment, of tracking user interactions with a software component on the server-side.

In another example embodiment, server-side data collection is used. FIG. 4 is a diagram illustrating a method 400, in accordance with an example embodiment, of tracking user interactions with a software component on the server-side. Here, when a web browser 402 requests 404 a web page from a web server 406, the web server 406 returns 408 a web page that does not have the tracking code. Here, an API is actually run by the web server 406, upon receiving a request 404 from a client to perform a particular function. It is the web server 406 that then generates and passes the analytics 410 to the data collection server 412, when the user has a value exceeding the specified threshold.

Figure 5:
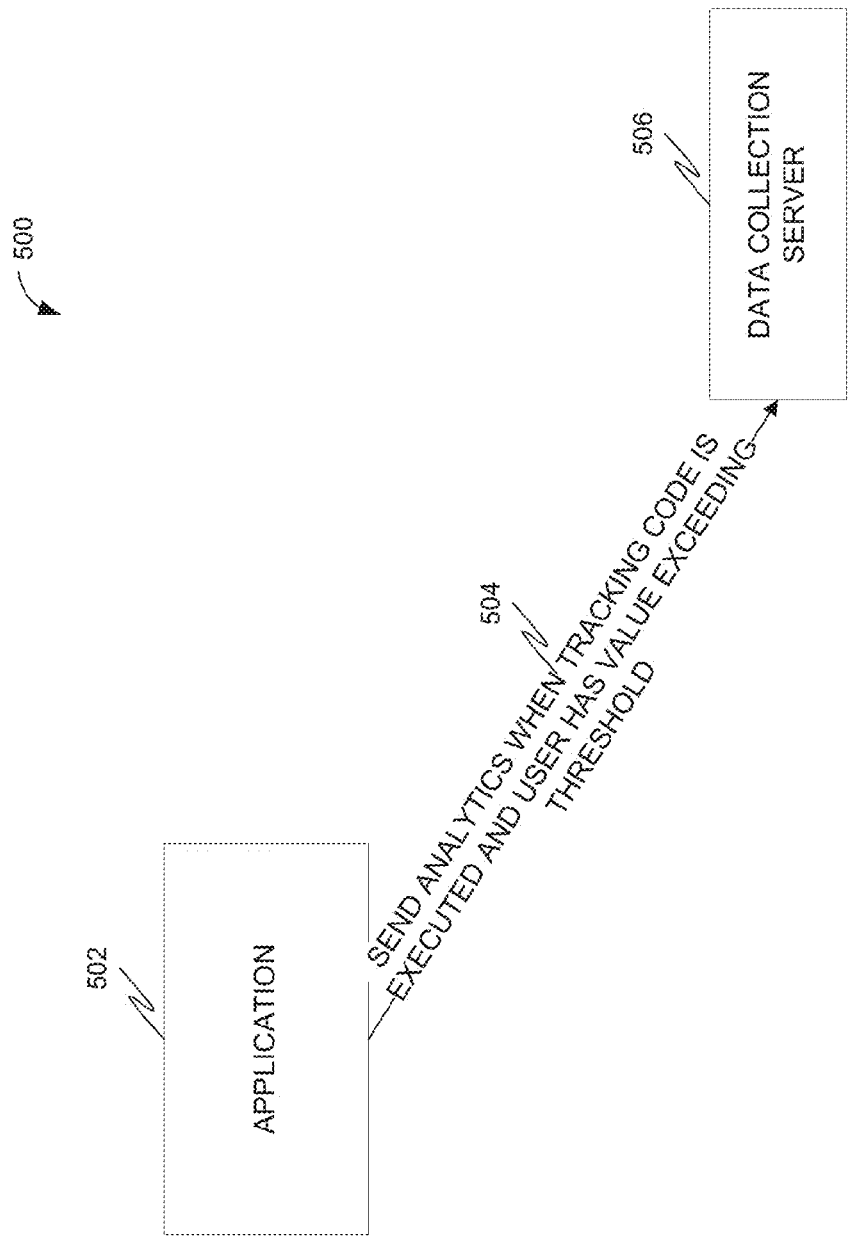
FIG. 5 is a diagram illustrating a method, in accordance with an example embodiment, of tracking user interactions with an application.

In another example embodiment, an application running on an end user device, such as a mobile device, may include the tracking code. This code may be hard-coded into the application, or may be a separate module that interacts with the application to monitor functions. FIG. 5 is a diagram illustrating a method 500, in accordance with an example embodiment, of tracking user interactions with an application. Here, an API or other code is run by the application 502 on an end-user device, which upon performing a particular function, generates and passes the analytics 504 to the data collection server 506.

In some example embodiments, a combination of both client and server implementations may be used, such that some analytics requests are triggered by functions on the server while others are triggered by functions on the client, either by a web browser or by a stand-alone application (or both).

Figure 6:
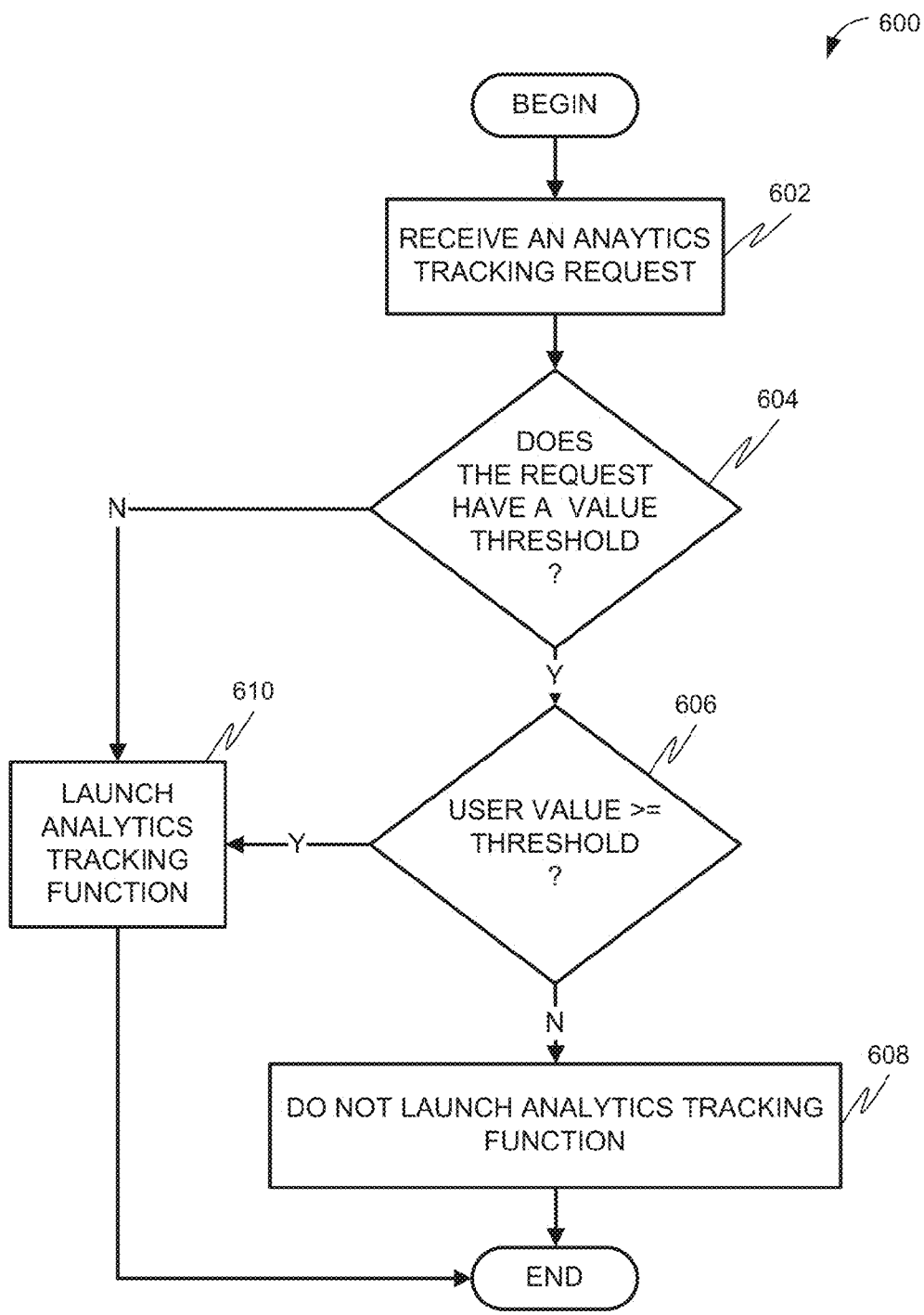
FIG. 6 is a flow diagram illustrating a method, in accordance with an example embodiment, of tracking user interactions with a software component.

FIG. 6 is a flow diagram illustrating a method 600, in accordance with an example embodiment, of tracking user interactions with a software component. At operation 602, an analytics tracking request is received. This tracking request may be triggered by, for example, a hook or other code running in an application. As described above, this application may be on the client-side, and also may or may not be the application whose function actually triggered the call. The tracking request may also be triggered by a server-side program in response to a function call received from a client device.

At operation 604, it is determined if the analytics tracking request has a value threshold. If so, then at operation 606, it is determined if a value for a user whose interactions triggered the analytics tracking request meets or exceeds the threshold. If not, then at operation 608, a corresponding analytics tracking function is not launched. If so, or if the request has no corresponding value threshold, then a corresponding analytics tracking function is launched at operation 610.

Figure 7:
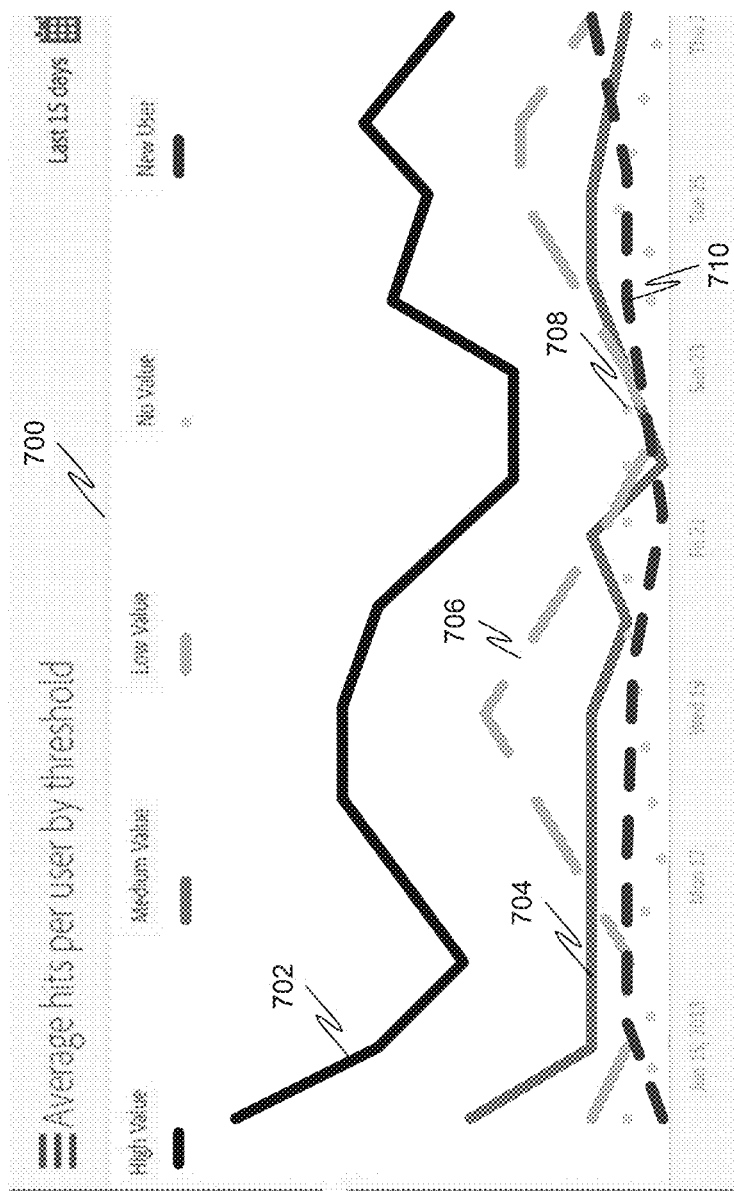
FIG. 7 is a screen capture illustrating an example report of analytics broken out by user value.

Utilizing different thresholds for different value users also allows for analytics reports to be broken out by user value. FIG. 7 is a screen capture illustrating an example report from analytics broken out by user value. As can be seen, a line chart 700 is presented showing a metric (here, average hits per user) broken out by value thresholds. Different lines are presented for high value users 702, medium value users 704, low value users 706, no value users 708, and new users 710.

In another example embodiment, mobile libraries may be utilized to capture native application activity on individualized mobile devices. For example, the user, usage, behavior, gestures, and the like, may be collected on these mobile devices, even if the activity is device-specific. As such, the above tracking calls and tracking requests need not be limited to activities generic to all devices. For example, a specific tracking call may be designed to be triggered upon a user's pressing of a home button on an iPhone, which is a button that has no correspondence to a button on another type of device.

In another example embodiment, it may be beneficial to break requests for large amounts of data into smaller ones, in order to speed the return of data. Additionally, it may be beneficial to break requests into shorter time frames.

In an example embodiment, analytics tracked through the above process may be utilized to create a holistic view of a business by turning customer interactions into actionable insights. This may be accomplished through the use of intuitive and interactive dashboards and reports that allow an application developer or other business to sift, sort, and share real-time information to provide insights to identify problems and opportunities.

Dashboards may be created with, for example, a drag-and-drop dashboard builder or with a report builder for spreadsheet-based dashboards. While there may be more customization options with spreadsheet-based dashboards, the drag-and-drop dashboards still can play an effective and vital role in disseminating data.

As an example, reports can be created that compare any variable to any other variable with the results plotted over time. This may be started with a conversion funnel, which shows how far visitors went in a purchasing process and how much revenue was produced at each stage. By combining these features, a developer or other business entity can generate a conversion funnel for one month and compare it to one for another month in order to analyze site or application activity trends.

The dashboards may then be further personalized to deliver quick snapshots of key performance indicators for various initiatives, such as online marketing initiatives. Data may also be presented graphically. For example, clickmap graphic overlays may measure traffic, commerce, and success metrics visually to display relevant elements on each page of a website or each portion of an application. Furthermore, advanced real-time segmentation may be provided, allowing a developer or other business entity to view segment data in real-time from a report suite, and access predefined segments, such as mobile visitors, directly from the user interface.

In another example embodiment, automatic notification of event triggers may be established to execute when key metrics exceed or fall below certain expectations. These expectations may either be set automatically or via user input. Additionally, these metrics may be modified dynamically in light of real-world changes (either explicit or implicit). For example, the system may detect that certain of the underlying bases for a particular threshold may have changed, and may automatically adjust such thresholds to anticipate a change in expectations.

In an example embodiment, JavaScript tagging can be accomplished via two elements: page code and a library file.

Page code is a block of specific code that may be embedded directly within a web page (e.g., HTML file) or application. The library file is a collection of specific methods and variables stored in a separate file from the page code. The web page or application section may include the page code. When this portion of the web page or application is executed, the page code sets the values for analytic data that is being collected and calls specific functions and variables in the library file.

In an example embodiment, web analytics data can be sent to the data collection server(s) and stored in data repositories called report suites.

In another example embodiment, third-party partner data may be integrated with a particular web site or applications data using a partner API. A partner may create an integration wizard to be run by an application or web site designer/provider. Once integrated, this allows both the partner and the application or web site designer/provider to obtain data from the partner and integrate it into a dashboard or other report.

Figure 8:
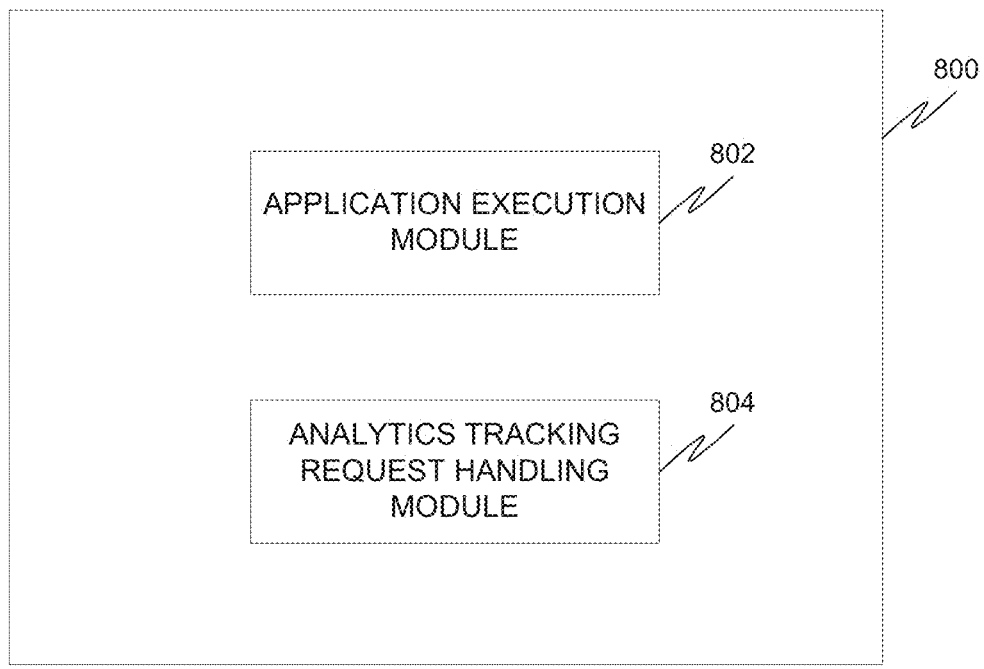
FIG. 8 is a block diagram illustrating an apparatus, in accordance with an example embodiment, of tracking user interactions with a software component.

FIG. 8 is a block diagram illustrating an apparatus 800, in accordance with an example embodiment, of tracking user interactions with a software component. The apparatus may include an application execution module 802, which may execute code, with the code including code making a call to one or more analytics tracking requests via an API, in response to interactions by users. The apparatus may also include an analytics tracking request handling module 804. The analytics tracking request handling module 804 may act to receive an analytics tracking request. This tracking request may be triggered by, for example, a hook or other code running in an application. As described above, this application may be on the client-side, and also may or may not be the application whose function actually triggered the call. The tracking request may also be triggered by a server-side program in response to a function call received from a client device.

The analytics tracking request handling module 804 may then determine if the analytics tracking request has a value threshold. If so, it may be determined if a value for a user whose interactions triggered the analytics tracking request meets or exceeds the threshold. If not, then the analytics tracking request handling module 804 may not launch a corresponding analytics tracking function. If so, or if the request has no corresponding value threshold, then analytics tracking request handling module 804 may launch a corresponding analytics tracking function.

Figure 9:
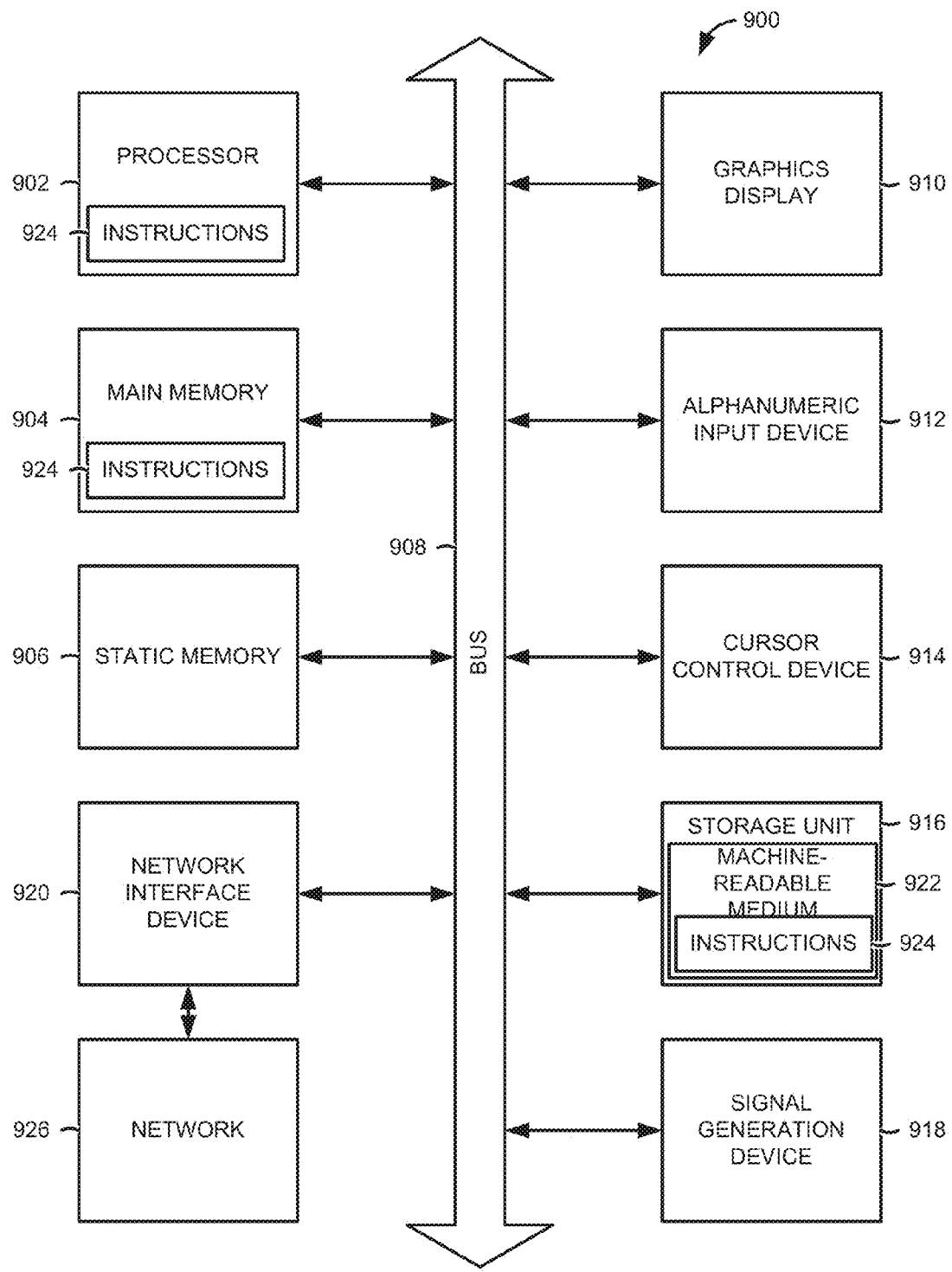
FIG. 9 is a block diagram of a computer processing system at a server system, within which a set of instructions may be executed for causing the computer to perform any one or more of the methodologies discussed herein.

FIG. 9 is a block diagram of a computer processing system 900 at a server system, within which a set of instructions may be executed for causing the computer to perform any one or more of the methodologies discussed herein.

Example embodiments may also, for example, be deployed by Software-as-a-Service (SaaS), application service provider (ASP), or utility computing providers, in addition to being sold or licensed via traditional channels. The computer may be a server computer, a PC, a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 900 includes processor 902 (e.g., a central processing unit (CPU), a GPU or both), main memory 904, and static memory 906, which communicate with each other via bus 908. The processing system 900 may further include graphics display unit 910 (e.g., a plasma display, a liquid crystal display (LCD), or a cathode ray tube (CRT)). The processing system 900 also includes alphanumeric input device 912 (e.g., a keyboard), a cursor control device 914 (e.g., a mouse, touch screen, or the like), a storage unit 916, a signal generation device 918 (e.g., a speaker), and a network interface device 920.

The storage unit 916 includes machine-readable medium 922 on which is stored one or more sets of instructions 924 and data structures (e.g., software) embodying or utilized by any one or more of the methodologies or functions described herein. The instructions 924 may also reside, completely or at least partially, within the main memory 904 and/or within the processor 902 during execution thereof by the processing system 900, with the main memory 904 and the processor 902 also constituting machine-readable, tangible media.

The instructions 924 may further be transmitted or received over network 926 via a network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding, or carrying a set of instructions for execution by the computer and that cause the computer to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A computerized method for tracking, on a client device, one or more user interactions with a software component at least partially operating on the client device, the method comprising:
   receiving, from a remote server device, an analytics tracking request triggered by at least a first user interaction tracked by the client device, wherein the analytics tracking request is assigned a threshold value that is based on at least the first user interaction;
   incrementing on the client device, based on at least the first user interaction, a user value associated with the user, the user value being locally-stored in a file system of the client device and maintaining a sum of interaction values associated with each of at least a second user interaction tracked by the client device;
   determining that the locally-stored user value exceeds the threshold value that is based on at least the first user interaction; and
   launching, on the client device, an analytics tracking function associated with the analytics tracking request based on a determination that the locally-stored stored user value exceeds the threshold value that is based on at least the first user interaction.

2. The computerized method of claim 1, wherein the user value reflects a perceived worth of the user to an entity.

3. The computerized method of claim 2, wherein the entity is a web site provider providing a web page executed by the software component when the user interactions occur.

4. The computerized method of claim 2, wherein the user value is based at least on an estimate of purchases to be made by the user within a certain time period.

5. The computerized method of claim 1, wherein when launching the analytics tracking function, the analytics tracking function calls an application program interface (API) to collect and send analytics data to a data collection server.

6. The computerized method of claim 1, wherein the user interactions are triggered within a browser running a web page, the web page containing page code calling the analytics tracking request.

7. An apparatus comprising:
   an application execution module configured within a web-browser, executable by a processor and configured to execute code for making a call to one or more analytics tracking requests via an application program interface (API), in response to at least one tracked user interaction with a software component executing on a client device, the software component being a web page provided by a server;
   an analytics tracking request handling module also configured within the web-browser and configured to:
   receive, from the server, an analytics tracking request triggered by at least a first user interaction, wherein the analytics tracking request is assigned a threshold value that is based on at least the first user interaction;
   increment on the client device, based on at least the first user interaction, a user value associated with the user, the user value being locally-stored in a file system of the client device and maintaining a sum of interaction values associated with each of at least a second user interaction tracked by the client device;
   determine that the locally-stored user value exceeds the threshold value that is based on at least the first user interaction; and
   launch, on the client device, an analytics tracking function associated with the analytics tracking request based on a determination that the locally-stored user value exceeds the threshold value that is based on at least the first user interaction.

8. The apparatus of claim 7, wherein launching the analytics tracking function includes calling an application program interface (API) to collect and send analytics data to a data collection server.

9. A non-transitory machine-readable storage medium comprising a set of instructions which, when executed by a processor, causes execution of operations of tracking, on a server device, user interactions with a software component operating on a client device and in communication with the server, the operations comprising:
   receiving, on the server device, a function call to send an analytics tracking request to the client device, wherein the function call is triggered by at least a first user interaction that is tracked on the client device, wherein each tracked user interaction has an associated interaction value, and wherein the analytics tracking request is assigned a threshold value that is based on at least the tracked first user interaction;
   sending, to the client device, the analytics tracking request in response to receiving the function call; and
   receiving, on the server, analytics data from the client device based on a determination on the client device that a stored user value exceeds the assigned threshold value that is based on at least the first user interaction, wherein the user value is stored in a file system of the client device and maintains a sum of interaction values associated with each of at least a second user interaction tracked by the client device.

10. The apparatus of claim 7, wherein the user value reflects a perceived worth of the user to an entity.

11. The apparatus of claim 10, wherein the entity is a web site provider that provides the software component.

12. The apparatus of claim 10, wherein the user value is based at least on an estimate of purchases to be made by the user within a certain time period.

13. The non-transitory machine-readable storage medium of claim 9, wherein the analytics data retrieved from the software component is collected and sent to the server using an analytics tracking function that is launched within the software component.

14. The non-transitory machine-readable storage medium of claim 9, wherein the user value reflects a perceived worth of the user to an entity.

15. The non-transitory machine-readable storage medium of claim 14, wherein the user value is based at least on an estimate of purchases to be made by the user within a certain time period.

16. The method of claim 1, wherein the user value stored in the file system of the client device and exceeding the threshold value is tied to a particular user interaction having a particular associated interaction value that incremented the user value to exceed the threshold value.

17. The non-transitory machine-readable storage medium of claim 9, wherein the threshold value can be adjusted by one of a tag management solution or a periodically checked update server.

18. The computerized method of claim 1, wherein at least one of the first user interaction and the second user interaction is device-specific.

19. The computerized method of claim 5, wherein the analytics data is broken into smaller pieces to speed the sending of data to the data collection server.

20. The computerized method of claim 5, wherein the collection of analytics data is collected by the data collection server in short time frames.

* * * * *

UNITED STATES PATENT AND TRADEMARK OFFICE
CERTIFICATE OF CORRECTION

PATENT NO. : 10,423,970 B2
APPLICATION NO. : 13/975625
DATED : September 24, 2019
INVENTOR(S) : Peter Raymond Fransen Page 1 of 1

It is certified that error appears in the above-identified patent and that said Letters Patent is hereby corrected as shown below:

In the Drawings

Sheet 6 of 9, FIG. 6, reference numeral 602, Line 1, delete "ANAYTICS" and insert
-- ANALYTICS --, therefor.

In the Claims

In Column 9, Line 27, Claim 1, after "locally-stored" delete "stored".

In Column 10, Line 16, Claim 9, before "user" insert -- one or more --.

Signed and Sealed this
Nineteenth Day of May, 2020

Andrei Iancu
*Director of the United States Patent and Trademark Office*